United States Patent [19]
Ouchi

[11] Patent Number: 5,744,720
[45] Date of Patent: Apr. 28, 1998

[54] ROLLING BEARING UNIT WITH ROTATING SPEED DETECTOR

[75] Inventor: Hideo Ouchi, Fujisawa, Japan

[73] Assignee: NSK Ltd., Tokyo, Japan

[21] Appl. No.: 577,934

[22] Filed: Dec. 22, 1995

[30] Foreign Application Priority Data

Dec. 27, 1994 [JP] Japan ............... 6-325517

[51] Int. Cl.$^6$ ............... G01P 3/22; G01P 3/48; F16C 32/00; G01B 7/14
[52] U.S. Cl. ............... 73/514.39; 73/519.01; 73/520.01; 324/174; 324/207.15; 324/207.25; 310/168; 310/171; 384/448
[58] Field of Search ............... 73/514.39, 519.01, 73/520.01; 324/174, 207.15, 207.25; 310/168, 171; 384/448

[56] References Cited

U.S. PATENT DOCUMENTS

| | | | |
|---|---|---|---|
| 5,018,384 | 5/1991 | Hayashi et al. | 73/118.1 |
| 5,023,547 | 6/1991 | Pawlak et al. | 324/174 |
| 5,293,124 | 3/1994 | Caillaut et al. | 324/173 |
| 5,309,094 | 5/1994 | Rigaux et al. | 324/174 |
| 5,332,964 | 7/1994 | Ouchi | 324/174 |
| 5,434,503 | 7/1995 | Rigaux et al. | 324/174 |
| 5,523,680 | 6/1996 | Sumi | 324/174 |

Primary Examiner—Hezron E. Williams
Assistant Examiner—Richard A. Moller
Attorney, Agent, or Firm—Evenson, McKeown, Edwards & Lenahan, PLLC

[57] ABSTRACT

The sensor 20a has first and second permanent magnets 31, 32, stator 33 and coil 24. The first and second permanent magnets 31, 32 has an inner peripheral face formed with south and north poles circumferentially and alternately with a uniform space therebetween. Holes 17a, 17b are formed circumferentially with a uniform space therebetween in the tone wheel 13. At the moment when all the south poles in the first permanent magnet 31 are opposed to the holes 17a, all the north poles of the second permanent magnets 32 are opposed to the holes 17b, resulting in that the alternating magnetic flux flows in the stator 33 and the electric voltage is generated alternately in opposite directions in the coil 24 as the tone wheel 13 rotates.

2 Claims, 7 Drawing Sheets

5,744,720

ROLLING BEARING UNIT WITH ROTATING SPEED DETECTOR

1. Field of the Invention

This invention is related to a rolling bearing unit with rotating speed detector to support a vehicle wheel with respect to a suspension apparatus freely rotatably and to detect the rotating speed of the wheel.

2. Description of the Prior Art

Various constructions for a rolling bearing unit with rotating speed detector to detect rotating speed of the vehicle wheel are known up to now in order that a vehicle wheel is supported with respect to the suspension apparatus freely rotatably while an anti-lock brake system (ABS) or a traction control system (TCS) is controlled.

The rotating speed detector which is installed in the rolling bearing unit with rotating speed detector has a tone wheel which rotates with the vehicle wheel and a sensor which outputs a signal with the frequency of which changes in proportion to the rotating speed of the tone wheel.

Various tone wheels and sensors are known up to now. Used widely is the rotating speed detector of the passive type which has a coil and uses a tone wheel made of magnetic material where the voltage generated in the coil of the sensor changes according to the rotation of the tone wheel, because it does not use expensive components.

The passive type rotating speed detector which comprises an annular sensor to make the output of the sensor larger as shown, for example, in HATSUMEI KYOKAI Technical Report Publication No. 94-16051 is known in the prior art.

FIGS. 8 and 9 show a rolling bearing unit with rotating speed detector as disclosed in this Technical Report Publication.

A rotating ring assembly has a hub and an inner ring member 5, and the hub 1 has an axially outer end portion (the term "axially outer" in the specification means the outer side in a widthwise direction when installed in the vehicle; left in figures) which is formed with a flange 2 for wheel fixture on its outer peripheral face, a mid-portion which is formed with a rotating inner ring raceway 3a and a step portion 4 on its outer peripheral face, and an axially inner end portion (the term "axially inner" means the center side in a widthwise direction when installed in the vehicle; right in figures) which has an inner ring member 5 provided on its outer peripheral face.

The inner ring member 5 is formed with an inner ring raceway 3b and externally fitted to the outer peripheral face of the hub 1 with an axially outer end face thereof abutted against the step portion 4.

There is also the case where, instead of directly forming the inner ring raceway 3a on the outer peripheral face of the hub 1, it is formed as an inner ring member (not shown) separate from the hub 1, and externally fitted to the hub 1 together with the inner ring member 5.

A male-threaded portion 6 is formed on the axially inner end portion of the hub 1. The inner ring member 5 is fixed at a predetermined location on the outer peripheral face of the hub 1 by means of a nut 7 which is threaded onto the threaded portion 6 and tightened, thus constituting the inner ring assembly together with the hub 1.

A stationary outer ring member 8 located around the hub 1 has a mid-portion which is provided with an attachment portion 9 on an outer peripheral face thereof, for fixing the outer ring member 8 to a suspension apparatus.

An inner peripheral face of the outer ring member 8 is formed with stationary outer ring raceways 10a, 10b opposite to the inner ring raceways 3a, 3b, respectively.

A plurality of rolling elements 11 are provided between the inner ring raceways 3a, 3b and the outer ring raceways 10a, 10b, respectively, so that the hub 1 is rotatable inside the outer ring member 8.

The inner peripheral face of the outer ring member 8 is referred to as "first peripheral face" while the outer peripheral face of the mid-portion of the hub 1 and the outer peripheral face of the inner ring member 5 are referred to as "second peripheral face".

In the case of a hub unit for heavy vehicles, tapered rollers are used for the rolling bodies instead of the balls shown FIGS. 8 and 9.

A seal ring 12 is fitted between the inner peripheral face at the axially outer end of the outer ring member 8, and the outer peripheral face of the hub 1, to cover the opening at axially outer end of the space in which the plurality of rolling elements 11 are provided between the inner peripheral face of the outer ring member 8 and the outer peripheral face of the hub 1.

A tone wheel 13 has a base end portion (left end in FIGS. 8 and 9) which is externally fixed to a portion on an axially inner end of the inner ring member 5 which is spaced away from the inner ring raceway 3b.

The tone wheel 13 is made of magnetic metal plate such as steel plate, and is entirely annular or short cylindrical. The tone wheel 13 comprises a smaller diameter portion 14, a larger diameter portion 15 and a step portion 16 that are continuous and concentric with each other. This kind of tone wheel 13 is fixed to the inner ring member 5, such that the larger diameter portion 15 is fitted around the outer peripheral face on the axially inner end portion of the inner ring member 5, so that the step portion 16 comes in contact with the axially inner edge of the inner ring member 5. Therefore, the smaller diameter portion 14 is supported so that it is concentric with the lower ring member 5.

There are several through-holes 17 formed around the smaller diameter portion 14 at equal intervals in the circumferential direction to form a first cut out section. Each of these holes 17 are identical and are rectangular shaped to extend in the axial direction (left and right in FIGS. 8 and 9). Only cross-sections of the holes 17 are illustrated in FIG. 8 and FIG. 9.

An opening portion at the axially inner end portion of the outer ring member 8 is covered with a cover 18 made for example by deep drawing forming a metal sheet such as stainless steel plate, or aluminum alloy plate into the form of a bottomed cylinder.

A synthetic resin mass or block 21 in which is embedded an annular sensor 20 is fixed and retained within the cylindrical portion 19 of the cover 18. This sensor 20 comprises a permanent magnet 22, a stator 23 made of magnetic material such as steel plate, and a coil 24. By embedding the permanent magnet 22, stator 23 and coil 24 in the synthetic resin mass or block 21, the sensor 20 can be made generally annular.

Of these components which make up the sensor 20, the permanent magnet 22 is formed in a generally annular or circular ring shape and radially magnetized. The inner peripheral face of this permanent magnet 22 is faced, through a small clearance 25, to the outer peripheral face of a base portion of the smaller diameter portion 14 of the tone wheel 13 where the holes 17 are not formed.

The stator 23 is formed so that it is entirely annular and has a radially outer cylindrical section 26 and a radially inner cylindrical section 27 connected to each other through a radial section in a substantially J-shaped cross section.

The inner peripheral face on the axially outer end of the radially outer cylindrical section 26 of the stator 23 is very near or comes in contact with the outer peripheral face of the permanent magnet 22. Moreover, the inner peripheral face of the radially inner cylindrical section 27 of the stator 23 is faced to a portion of the tone wheel 13 where the holes 17 are formed.

Furthermore, there is a second cut out section around the radially inner cylindrical section 27 of the stator 23 where a plurality of stationary notches 28 with an axial open end are formed, so that they are located around the cylindrical section 27 circumferentially with the same pitch as the holes 17. The pitch is also referred to as center-angle pitch. Accordingly, the radially inner cylindrical section 27 is formed so that it is comb-toothed.

The coil 24 is formed by winding a conductive wire around a non-magnetic ring 29 so that it is annular shaped, and it is located on the inner peripheral side of the radially outer cylindrical section 26 of the stator 23. The electromotive force (emf) generated in this coil 24 is output from a connector 30 that protrudes from the outside surface of the cover 18.

When using the rolling bearing unit with rotating speed detector constructed as described above, as the tone wheel 13 rotates with the hub 1, the density of the magnetic flux flowing in the stator 23, which is faced to the tone wheel 13, changes, so that the voltage generated in the coil 24 changes at a frequency that is proportional to the rotational speed of the hub 1. The theory behind the change of voltage generated in the coil 24 due to the change in density of the magnetic flux flowing in the stator 23 is the same as that applied for rotating speed detector that have been widely used in the prior art. The reason that the density of the magnetic flux flowing in the stator 23 changes due to the rotation of the tone wheel 13 is described below.

The through-holes 17 formed around the tone wheel 13 and the notches 28 formed around the stator 23 have the same pitch, so that as the tone wheel 13 rotates, there are moments when they are all faced to each other at the same time. At the moment when these holes 17 and notches 28 are faced to each other, the magnetic column portions located between each pair of adjacent holes 17 and the magnetic tongue-shaped portions located between each pair of adjacent notches 28 are faced to each other through a small clearance 25 between them. When the magnetic column sections and magnetic tongue-shaped sections are faced to each other, the density of the magnetic flux flowing between the tone wheel 13 and the stator 23 is high.

In contract to this state, when the holes 17 and notches 28 are half out of phase, the density of the magnetic flux flowing between the tone wheel 13 and the stator 23 becomes low. In other words, in this state, the holes 17 formed around the tone wheel 13 are faced to the tongue-shaped sections, while at the same time, the notches 28 formed around the stator 23 are faced to the column sections. When the column sections are faced to the notches 28 and the tongue-shaped sections are faced to the holes 17, there is a comparatively large gap or clearance between the tone wheel 13 and the stator 23 generally in the circumference. In this state, the density of the magnetic flux flowing between the tone wheel 13 and the stator 23 becomes low.

As a result, the voltage generated in the coil 24 changes proportionally with the rotational speed of the hub 1.

By using a sensor 20 like described above, the output voltage generated in the coil 24 changes with a frequency proportional to the rotational speed of the hub 1. There is an existing annular space in the opening end portion of the outer ring member 8. It is possible to utilize this annular limited space for installing the sensor 20 to make the output of the sensor 20 sufficiently large enough to reliably detect the rotational speed of the hub 1 rotating together with the vehicle wheel. The permanent magnet 22, the stator 23 and the coil 24, which make up the sensor 20 are all formed in an annular shape that entirely surrounds the tone wheel 13. Since the magnetic flux that comes from the permanent magnet 22 flows all the way around the stator 23, the amount of magnetic flux that flows generally through the stator 23 can be made sufficiently large enough. Thus the change in voltage on the coil 24 that corresponds to the change in density of the magnetic flux passing through the stator 23, can be made large.

The prior art rotating speed detector having the annular sensor 20 can have a larger output than those having the rod shaped sensor and known in the art before the annular sensor 20 is disclosed. However, the degree of improvement of the output in the rotating speed detector with the annular sensor 20 is smaller compared with the degree that the permanent magnet 22, stator 23 and coil 24 are made larger in size, so that the improvement in the rotating speed detector is further required.

One of the reasons that the degree of improvement of the output in the prior art rotating speed detector is small compared with the degree that the permanent magnet 22, stator 23 and coil 24 are made larger is that the amount of change of the flux flowing through the stator 23 is small.

Specifically, as described previously, at the moment when the through-holes 17 and the notches 28 are faced to each other respectively, the magnetic flux flowing through the stator 23 is high in density, and at the moment when the holes 17 and notches 28 are half out of phase, the magnetic flux flowing through the stator 23 is low in density.

In the prior structure, the change of the magnetic flux density is caused only by the metal facing relationship between the through-holes 17 and the notches 28. Accordingly, when the holes 17 and the notches 28 are half out of phase, a certain amount of magnetic flux flows to the stator 23.

Consequently, the amount of change on the magnetic flux density is not large between the moment when the holes 17 and the notches 28 are faced to each other and the moment when they are half out of phase, so that the output voltage induced in the coil 24 is not so high.

In order to make the change amount (absolute value) of the magnetic flux, the permanent magnet 22 having a higher magnetic field (high magnetomotive force and high magnetic density) can be used for the sensor 20. However, when the magnetic field of the permanent magnet 22 is simply made stronger, the magnetic flux is easily saturated in the stator 23. When the magnetic flux is saturated in the stator 23 of the magnetic circuit, the change of the magnetic flux density in the stator 23 becomes extremely small, although the tone wheel 13 rotates. Thus, the output of the sensor 20 is smaller than expected.

SUMMARY OF THE INVENTION

Accordingly, the present invention is provided taking into consideration the situation mentioned above.

An object of the present invention is to provide a rolling bearing unit with rotating speed detector comprising a stationary ring having an end and a first peripheral face formed with a stationary raceway, a cover fixed to the end of the stationary ring, a rotating ring having an end and a second peripheral face being opposite to the first peripheral face and formed with a rotating raceway, a plurality of rolling elements rotatably provided between the stationary raceway and the rotating raceway, an annular tone wheel made of a magnetic material, fixed to the end of the rotating ring, and having a cutout section where a plurality of cutouts are circumferentially formed with a first pitch and a sensor opposed to the tone wheel and supported inside the cover, the tone wheel having a rotating cylindrical portion having a peripheral face and being concentric with the rotating and stationary rings, the output section formed in the peripheral face of the rotating cylindrical portion, the sensor comprising an annular first and second permanent segments, an annular magnetic stator, and an annular coil, the first and second permanent magnets having a first end face in magnetic orientation provided with the south and north poles alternately arranged with a uniform pitch, and faced to the cutout section in the peripheral face of the rotating cylindrical portion with a small clearance therebetween, the first and second permanent magnets having the second end face in magnetic orientation provided in contact with or close to the both ends of the stator, the south and north poles in the first end face in magnetic orientation of the first and second permanent magnets having a second pitch which is set to n·p, where n is an integer, and p is the first pitch in the cutout section, the phase of the south and north poles in the first end face in magnetic orientation of the first permanent magnet with reference to the cutout section is displaced from the phase of the south and north poles in the first end face in magnetic orientation of the second permanent magnet with reference at the cutout section by m·p/2, where m is an odd integer and p is the pitch of the cutout section, in other words, in an odd number multiple of the half pitch of the cutout section.

Consequently, at the moment when all of the south poles in the first end face in magnetic orientation of the first permanent magnet are face to the cutouts respectively, all of the north poles in the first end face of the second permanent magnet are faced to the cutouts.

In addition, the coil extends circumferentially around the mid portion of the stator.

DESCRIPTION OF THE PREFERRED EMBODIMENTS

Figure 1:
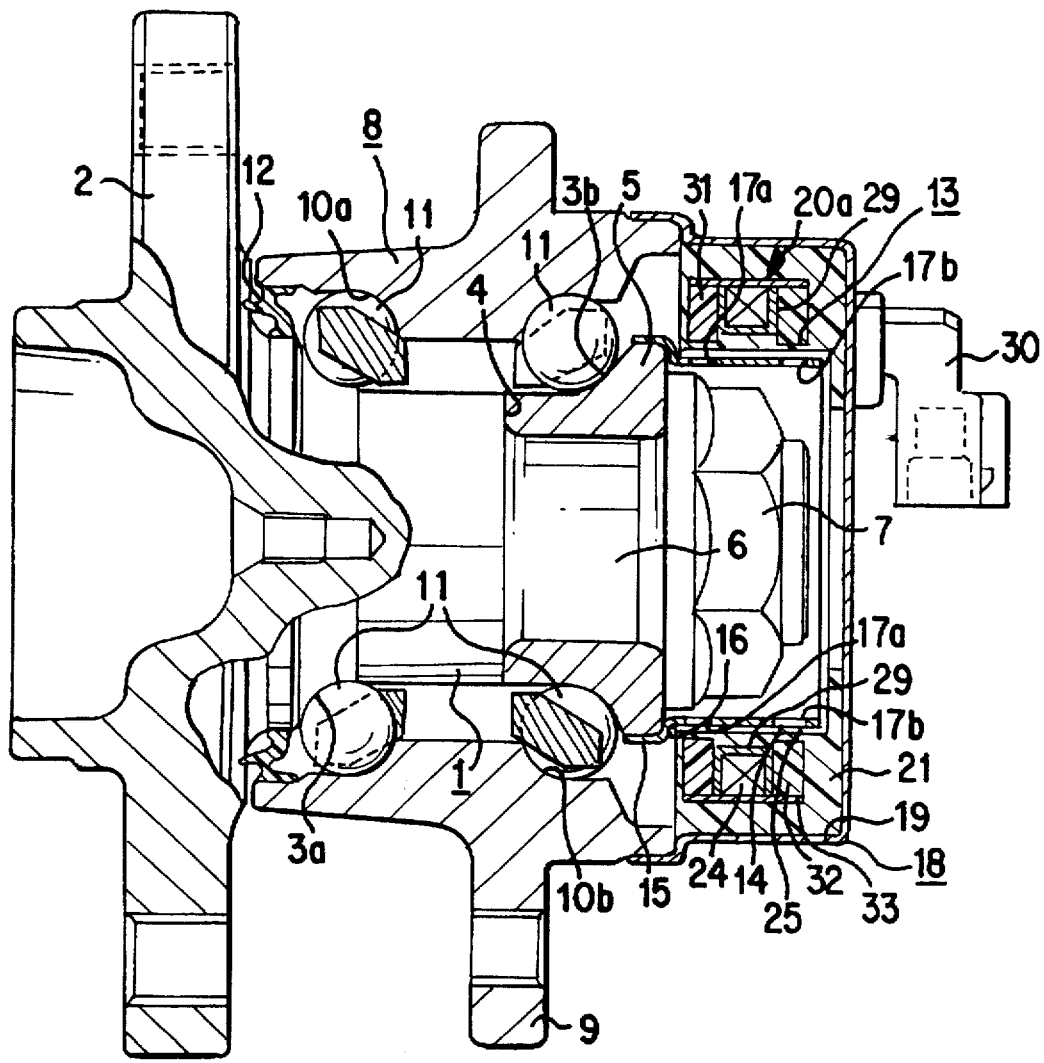
FIG. 1 is a partly cut-away, cross sectional view of the first embodiment in the present invention.

The rolling bearing unit with rotating speed detector of the present invention comprises a stationary ring having an end and a first peripheral face formed with a stationary raceway, a cover fixed to the end of the stationary ring, a rotating ring having an end and a second peripheral face being opposite to the first peripheral face and formed with a rotating raceway, a plurality of rolling elements rotatably provided between the stationary raceway and the rotating raceway, an annular tone wheel made of a magnetic material, fixed to the end of the rotating ring, and having a cutout section where a plurality of cutouts are circumferentially formed with a uniform space therebetween, that is with a pitch p, and a sensor opposed to the tone wheel and supported inside the cover.

Particularly, in the rolling bearing unit with rotating speed detector in the present invention, the tone wheel has a rotating cylindrical portion concentric with the rotating and stationary rings, and the cutout section is formed in the peripheral face of the rotating cylindrical portion.

The sensor comprises an annular first and second permanent magnets, an annular magnetic stator, and an annular coil.

The first and second permanent magnets have a first end face in magnetic orientation provided with the south and north poles alternately arranged with a uniform pitch.

The first end face in magnetic orientation is faced to the cutout section in the peripheral face of the rotating cylindrical portion with a small clearance between them.

The second end face in magnetic orientation of the first and second permanent magnets is provided in contact with or close to the both ends of the stator.

The south and north poles in the first end face in magnetic orientation of the first and second permanent magnets has a pitch which is set to n·p, where n is an integer, and p is the pitch in the cutout section in other words made in an integer multiple of the pitch in the output section.

In addition, the phase of the south and north poles in the first end face in magnetic orientation of the first permanent magnet with reference to the cutout section is displaced from the phase of the south and north poles in the first end face in magnetic orientation of the second permanent magnet with reference at the cutout section by m·p/2, where m is an odd integer and p is the pitch of the cutout section, in other words, in an odd number multiple of the half pitch of the cutout section.

Consequently, at the moment when all of the south pole in the first end face in magnetic orientation of the first permanent magnet are faced to the cutouts respectively, all of the north poles in the first end face of the second permanent magnet are faced to the cutouts.

In addition, the coil extends circumferentially around the mid portion of the stator.

The rolling bearing unit with rotating speed detector in the present invention supports the vehicle wheel rotatably to the suspension apparatus and detects the rotating speed of the vehicle wheel as in the prior art rolling bearing unit with rotating speed detector.

Particularly, in the rolling bearing unit of the present invention, as the tone wheel rotates, the alternating magnetic flux flows in the portion of the tone wheel faced to the permanent magnet. Specifically, the flow of the magnetic flux through the tone wheel changes in opposite directions alternately as the phase changes between the south and north poles in the first end face in magnetic orientation of the first and second permanent magnets and the cutouts on the peripheral face of the tone wheel.

For example, at the moment when all the south poles in the first end face in magnetic orientation of the first permanent are faced to the cutouts, respectively, all the north poles in the first end face in magnetic orientations of the first permanent magnet are faced to the column portions between the cutouts, while all the north poles in the first end face in magnetic orientation of the second permanent magnet are faced to the cutouts, and all the south poles in the first end face in magnetic orientation of the second permanent magnet are faced to the column portions. Accordingly, the magnetic flux flows from the north poles of the first permanent magnet to the column portions of the tone wheel, and from the column portions to the south poles of the second permanent magnet.

On the contrary, at the moment when all the north poles in the first end face in magnetic orientation of the first permanent are faced to the cutouts, respectively, all the south poles in the first end face in magnetic orientations of the first permanent magnet are faced to the column portions between the cutouts, while all the south poles in the first end face in magnetic orientation of the second permanent magnet are faced to the cutouts, and all the north poles in the first end face in magnetic orientation of the second permanent magnet are faced to the column portions. Accordingly, the magnetic flux flows from the north poles of the second permanent magnet to the column portions of the tone wheel, and from the column portions to the south poles of the first permanent magnet. Consequently, the magnetic flux flows alternately in opposite directions in the tone wheel, so that the voltage is alternately generated in opposite directions in the coil, that is, an alternating current flows. This can increase the sensor output.

In addition, even when the first and second permanent magnets having a strong magnetic field are used, the magnetic flux is hardly saturated in the stator, so that the cutout can be increased by making the magnetic flux density higher.

Now, the present invention is more detailed referring to the drawings.

Figure 2:
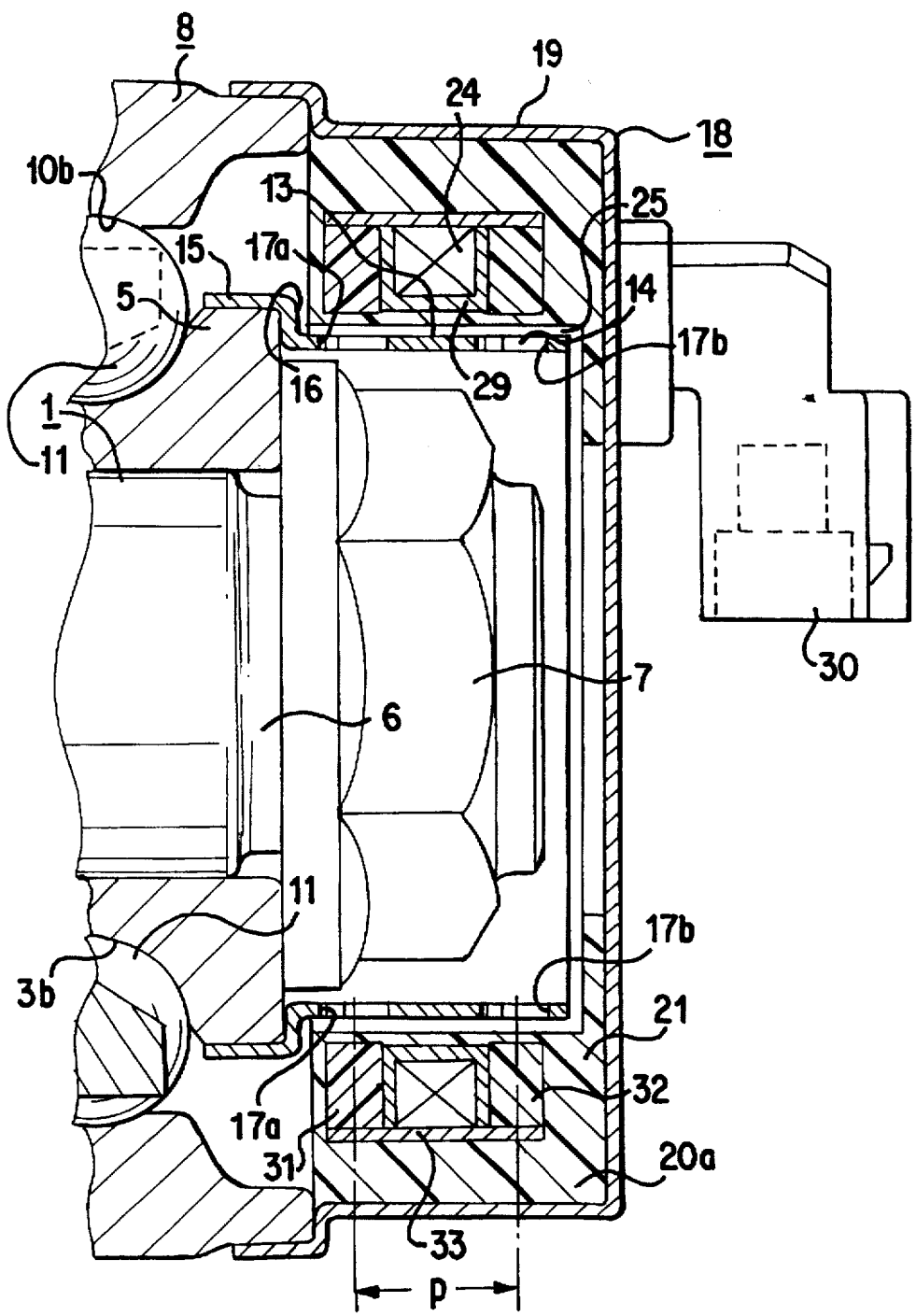
FIG. 2 is a partly cut-away enlarged view of a right portion in FIG. 1.
Figure 3:
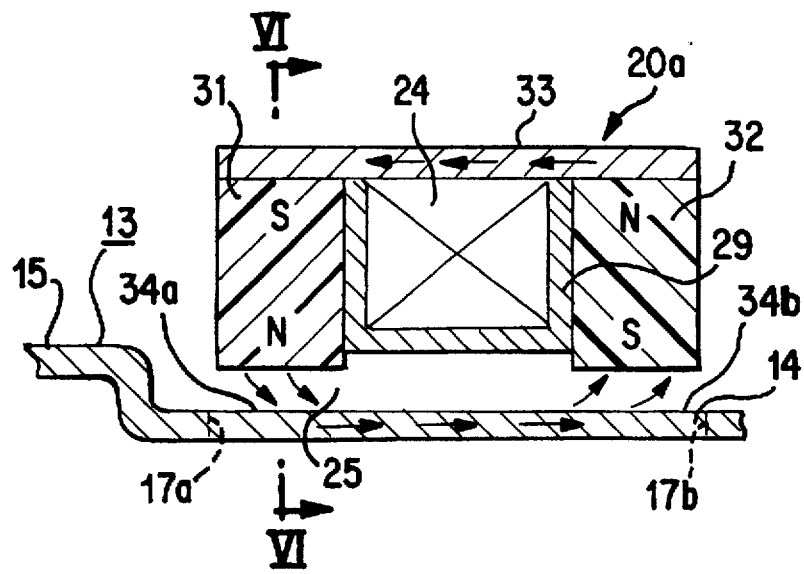
FIG. 3 is a enlarged partial view of the tone wheel and sensor by which the generation of output in the sensor is explained, where only cross-sections are illustrated.

FIGS. 1 thru 3 show a first embodiment of this invention. This invention is characterized in the sensor 20a including a first permanent magnet 31 and a second permanent magnet 32, in order to increase its output so that the magnetic flux flows in opposite directions alternately through the smaller diameter portion 14 of tone wheel 13 as the tone wheel 13 rotates. The other parts and construction are substantially nearly the same as the prior art construction mentioned above, an therefore like symbols will be used for like parts, and any redundant explanation will be omitted or simplified so that the explanation can be centered on the characteristics of this invention.

The rotating smaller-diameter section or cylindrical section 14 of the tone wheel 13 is concentric with the rotating ring or hub 1 and with stationary ring or outer ring member 8, and comprises a cut-out section formed with through-holes 17a, 17b that are evenly spaced with the same phase all the way around in the circumferential direction.

In the embodiment shown in the figures, the holes 17a, 17b are formed in two rows. The reason for this is, that if there were only one row of holes, the holes would be very long with respect to the column portion width (dimension of the portion between a pair of adjacent holes in the circumferential direction), so the column portions could be damaged, deformed or distorted very easily when forming them by using a pressing method. Therefore, if the length of the holes is short with respect to the column portion width, a single row of holes could be formed.

The sensor 20a comprises first and second permanent magnets 31, 32, a stator 33, and a coil 24 that are all annular shaped which means annular shape, short cylindrical shape, ring shape etc.

The stator 33 is made of magnetic material such as low carbon steel in a short cylindrical shape, and may be formed from a completely cylindrical member with no cutout in the circumferential direction or from an elongation steel sheet which is rounded to provide an axial cutout or slit at one circumferential location, that is, in a shape of notched-cylinder. This notched cylinder stator 37 is inexpensive due to lower production cost comparing with the completely cylindrical structure.

The coil 24 comprises a bobbin 29 made of a non-magnetic material such as synthetic resin and formed in a channel shape in cross section open in a radially outer direction, and a conductive wire wound around the bobbin 29. The coil 24 is supported radially inside the mid portion of the stator 33.

The ends of the conductive wire are taken out from the stator 33 through a hole or notch (not shown) in it and connected to a terminal of the connector 30.

The first permanent magnet 31 and second permanent magnet 32 are radially magnetized generally along their periphery; so that their inner peripheral face is a first end face in magnetic orientation while their outer peripheral face is a second end face in magnetic orientation, where the south and north poles are alternately arranged with a uniform pitch. The number of the poles on the inner peripheral face of the permanent magnet 31 is equal to that of the poles on the inner peripheral face of the permanent magnet 32.

It should be noted that although the permanent magnets 31, 32 are magnetized on both of the outer and inner peripheral faces thereof, only the inner peripheral face of the permanent magnet faced to the tone wheel can be magnetized in the muti-pole arrangement with the outer peripheral face provided with no pole.

The south and north poles alternately arranged in the inner peripheral faces of the permanent magnets 31, 32 have a pitch P (the pitch of the central angle of the similar poles adjacent to each other in the circumferential direction) is set to n·p, where n is an integer, with respect to the pitch p of the through-holes 17a, 17b, that is P=n·p.

In this embodiment, the pitch P of the south and north poles arranged in the inner peripheral faces of the permanent magnets 31, 32 is equal to the pitch p of the through-holes 7a, 17b in the smaller diameter portion 14 of the tone wheel 13, that is, P=p, n=1.

The inner peripheral face of the first and second permanent magnets 31, 32 is opposed across a clearance 25 to a cutout section in the outer peripheral face of the smaller diameter portion 14 where the through-holes 17a, 17b are formed.

The phase of the south and north poles on the inner peripheral face of the first permanent magnet 31 with reference to the through-holes 17a is displaced by n·p/2, where m is an odd integer and p is the pitch of the through-holes 17a, 17b, from the phase of the south and north poles on the inner peripheral face of the second permanent magnet 32 with reference to the through-hole 17b.

In the embodiment of in FIGS. 1 to 3, the phase of the south and north poles arranged in the inner peripheral face of the first and second permanent magnets 31, 32 is displaced by half the pitch of the through-holes 17a, 17b.

On the other hand, the phase of the through-holes 17a, 17b may be displaced by one half while the phase of the permanent magnet 31 coincides with that of the permanent magnet 32.

Consequently, at the moment when all the south poles on the inner peripheral face of the first permanent magnet 31 are opposed to the through-holes 17a while all the north poles are opposed to the column portions 34a between the adjacent through-holes 17a (FIGS. 3 and 4), respectively, all the north poles on the inner peripheral face of the second permanent magnet 32 are opposed to the through-holes 17b while all the south poles are opposed to the column portions 34b of the adjacent through-holes 17b (FIGS. 3 and 4), respectively.

The outer peripheral face, or second end face in magnetic orientation of the first and second permanent magnets 31, 32 is provided in contact with or close to the inner peripheral face at the both ends of the stator 33. Accordingly, the outer peripheral face of the permanent magnets 31, 32 is magnetically connected to the stator 33.

In the rolling bearing unit having rotating speed detector of the present invention as constructed above, as the hub 1 and the tone wheel 13 rotate, the alternating magnetic flux flows through the smaller diameter portion 14 of the tone wheel 13 of the sensor 20a.

Specifically, a magnetic flux flows between the first permanent magnet 31 and the second permanent magnet 32 of the sensor 20a through the stator 33 and the tone wheel 13, the direction of the magnetic flux flow is alternately changed in opposite directions as the phase of the south and north poles arranged in the inner peripheral faces of the permanent magnets 31, 32 and of the through-holes 17a, 17b formed in the smaller diameter portion 14 of the tone wheel 13 change.

For example, at the moment when all the south poles on the inner peripheral face of the first permanent magnet 31 and all the north poles on the inner peripheral face of the second permanent magnet 32 are opposed to the through-holes 17a, 17b, as shown in FIG. 3, all the north poles on the inner peripheral face of the first permanent magnet 31 and all the south poles on the inner peripheral face of the second permanent magnet 32 are opposed to the column portions 34a, 34b between the adjacent through-holes 17a, 17b, respectively.

Consequently, in the magnetic circuit formed by the first and second permanent magnets 31, 32 and the tone wheel 13 and the stator 33, the magnetic flux flows as shown arrows in FIG. 3. Specifically, in this state, the magnetic flux in the smaller diameter portion 14 of the tone wheel 13 flows from the inner peripheral face of the first permanent magnet 31 toward the inner peripheral face of the second permanent magnet 32.

In the coil 24 radially adjacent to the inner peripheral face at the mid portion of the stator 33, the voltage is induced corresponding to the directions (+, −) in which the magnetic fluxes flow.

Figure 4:
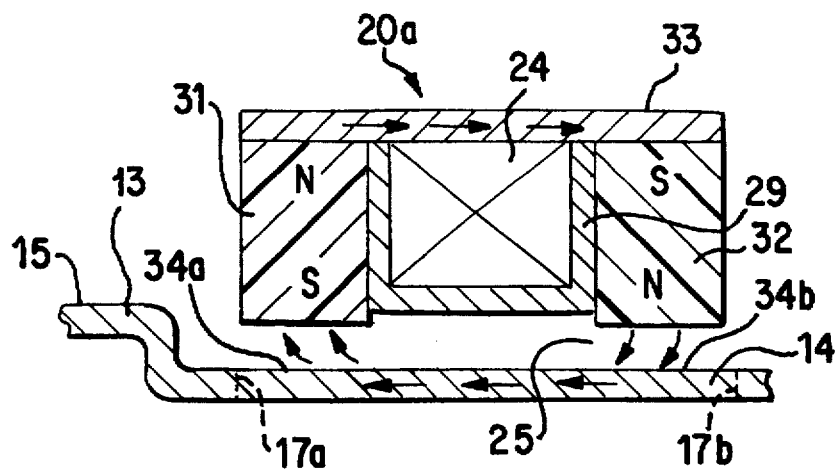
FIG. 4 is an enlarged partial view similar to FIG. 3 where the tone wheel is slightly rotated and circumferentially displaced from the position in FIG. 3, where only cross-sections are illustrated.

On the contrary, at the moment when all the north poles on the inner peripheral face of the first permanent magnet 31 and all the south poles on the inner peripheral face of the second permanent magnet 32 are opposed to the through-holes 17a, 17b, as shown in FIG. 4, all the south poles on the inner peripheral face of the first permanent magnet 31 and all the north poles on the inner peripheral face of the second permanent magnet 32 are opposed to the column portions 34a, 34b, respectively. Consequently, in the magnetic circuit constituted by the first and second permanent magnets 31, 32, the tone wheel 13 and the stator 33, the magnetic flux flows as shown by arrows in FIG. 4. Specifically, in this state, the magnetic flux in the smaller diameter portion 14 of the tone wheel 13 flows from the inner peripheral face of the second permanent magnet 32 toward the inner peripheral face of the first permanent magnet 31.

In the coil 24 radially adjacent to the inner peripheral face at the mid portion of the stator 33, the voltage is induced corresponding to the directions of the magnetic flux, such that the direction (−, +) of the voltage is opposed to that of FIG. 3. Accordingly, the alternating magnetic flux flows in the smaller diameter portion 14 of the tone wheel 13 with the rotation of the tone wheel 13 at a frequency proportional to the rotating speed of the tone wheel 13.

Also, in the coil 24, the alternating voltage is generated at the frequency proportional to the rotating speed based on the alternating magnetic flux in the smaller diameter portion 14 of the tone wheel 13.

The magnetic of output on the sensor 20a corresponds to the difference between the maximum and minimum of the voltage.

The output by the alternating current in the coil 24 is larger than by the direct current or simple change in voltage.

In addition, even if the first and second permanent magnets 31, 32 having a stronger magnetic field are used, the magnetic flux is hardly saturated in the stator 33, so that the output is increased by making the magnetic flux density higher.

Figure 5:
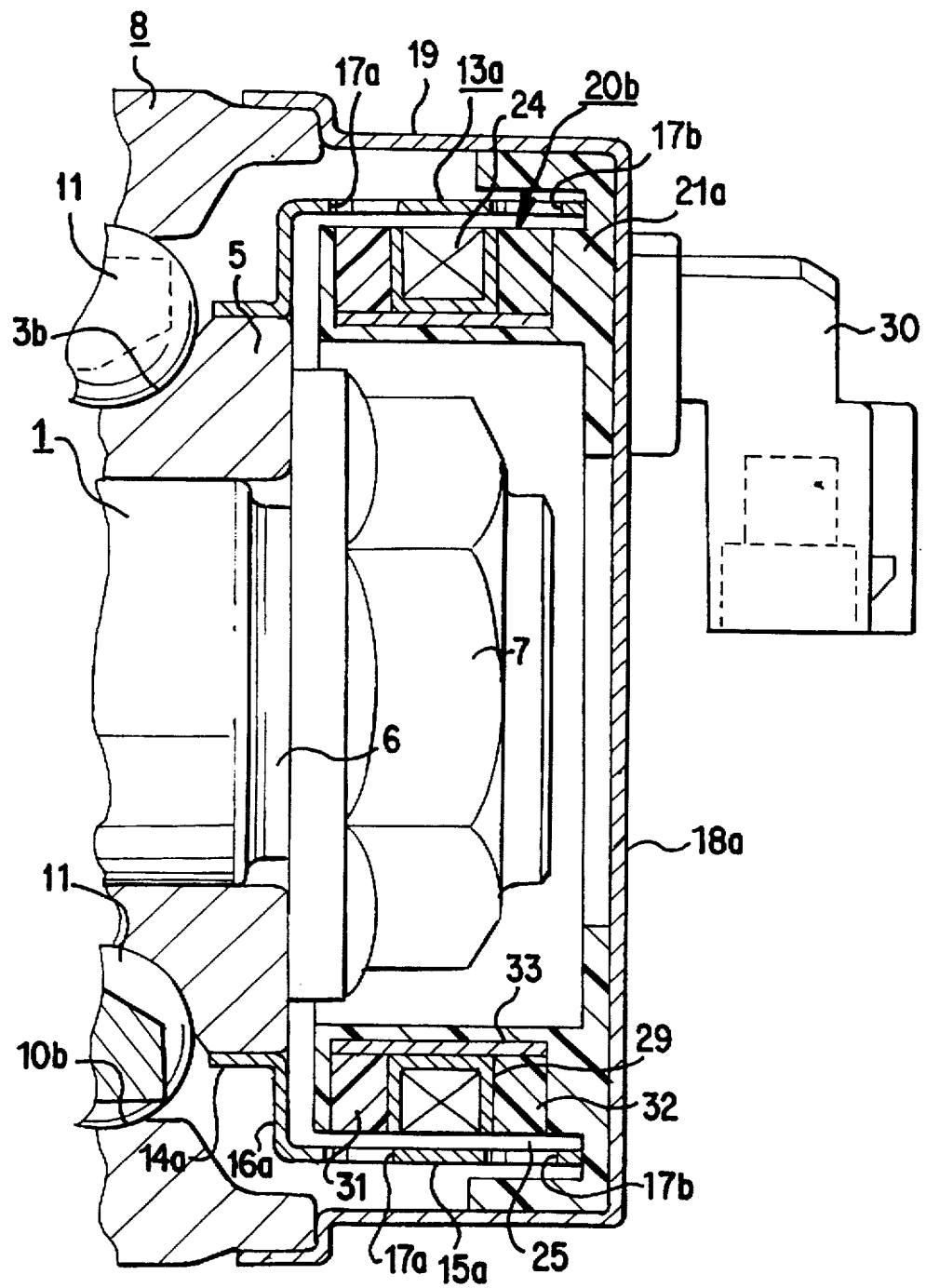
FIG. 5 is a partly cut-away, enlarged view similar to FIG. 2 to show a second embodiment of the present invention.

FIG. 5 shows a second embodiment of the present invention. In this embodiment, the peripheral speed of the tone wheel 13a is increased so as to further increase the output of the sensor 20b. Specifically, the tone wheel 13a used in this embodiment has a smaller diameter portion 14a, a larger diameter portion 15a and a step portion between the larger diameter portions 14a, 15a, which are concentric and continuous with each other.

The smaller diameter portion 14a of the tone wheel 13a is fitted onto a portion spaced away from the inner ring raceway 3b at the axially inner end portion of the inner ring member 5, so that the tone wheel 13a rotates with the hub 1.

The rotating ring or hub 1 and the stationary ring or outer ring member 8 are concentric with the rotating cylindrical portion or larger diameter portion 15a which is formed with a pair of rows of though-holes 17a, 17b arranged with a uniform spaced therebetween, respectively.

The sensor 20b includes an annular first and second permanent magnets 31, 32, annular stator 33 and annular coil 24.

The annular first and second permanent magnets 31, 32 are radially magnetized in their whole circumference, respectively. The first and second permanent magnets 31, 32 have a first end face in magnetic orientation of their outer peripheral face, such that the south and north poles are alternately formed in the same condition to that in the first embodiment. Accordingly, the outer peripheral face of the permanent magnets 31 and 32 is opposed to a portion of the inner peripheral face of the larger diameter portion 15a where the through-holes 17a, 17b are formed, with a small clearance 25 therebetween, respectively.

The second end face in magnetic orientation on the inner peripheral face of the permanent magnets 31 and 32 is placed in contact with or close to the outer peripheral face at the both end portions of the stator 33.

The sensor 20b constructed as mentioned above is embedded in the synthetic resin mass 21a in a generally annular, hat shape. The synthetic resin mass 21a is fixedly fitted into the cover 18a which is mounted to the opening portion at the axially inner end of the outer ring member 8. In this state, the inner peripheral face of the larger diameter portion 15a of the tone wheel 13a is opposed to the outer peripheral face of the sensor 20b supported in the synthetic resin mass 21a with the small clearance 25 therebetween.

The rolling bearing unit with rotating speed detector in the second embodiment rotatably supports a vehicle wheel to the suspension apparatus and detects the rotating speed of the vehicle wheel as in the first embodiment, but the radially inside and outside are reversed.

As the tone wheel 13 rotates together with hub 1, the alternating magnetic flux flows in the stator 33 of the sensor 20b opposed to the tone wheel 13a, so that the alternating electric current flows in the coil 24 proportional to the rotating speed of the tone wheel 13a.

Specifically, in the rolling bearing unit with rotating speed detector on the second embodiment, since the inner peripheral face of the larger diameter portion 15a the tone wheel 13a is opposed to the outer peripheral faces of the first and second permanent magnets 31 and 32, the portion where the magnetic flux flows can have a larger diameter.

In other words, since the larger diameter portion 15a is placed on the outer periphery side of the sensor 20b which must have a certain degree of thickness dimension in a radial direction due to the existence of the coil 24 etc., the larger diameter portion 15a can have a larger diameter. Consequently, an enough number of through holes 17a 17b is secured, so that the precision in detecting the rotating speed is improved. In addition, the through-holes 17a, 17b, the column portions 34a between the adjacent through-holes 17a and the column portions 34b between the adjacent through-holes 17b (FIGS. 3 and 4) can have a sufficient width size so as to increase the sensor output.

Figure 6:
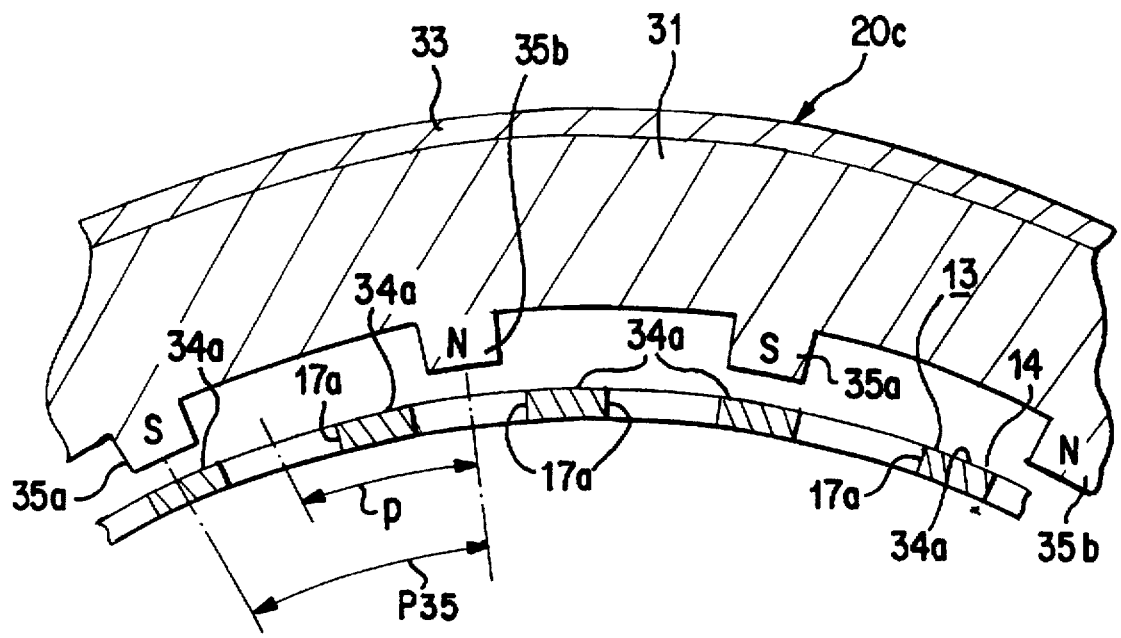
FIG. 6 is a cross sectional view taken along the line VI—VI of FIG. 3 to show a third embodiment of the present invention, where only cross-sections are illustrated.

FIG. 6 shows a third embodiment of the present invention, in which the inner peripheral face of the first permanent magnet 31 for combination with the first embodiment is formed with a plurality of alternating projections 35a, 35b in a circumferential direction with a uniform space therebetween. The second permanent magnet 32 is processed in the same manner.

The outer peripheral face of the permanent magnets 31, 32 can be utilized for combinations with the second embodiment.

The projections 35a, 35b alternately arranged has a pitch $P_{35}$ (=P/2) is set to $P_{35}$=m·p/2 where m is an odd integer and p is the pitch of the through-holes 17a (17b) in the tone wheel 13 (13a). The first permanent magnet 35a is radially magnetized, so that the first projections 35a form the south poles while the second projections 35b form the north poles.

Only the magnetized points required for changing the magnetic flux density in the first permanent magnet 31 processed as mentioned above, are placed closer to the outer peripheral face of the tone wheel 13 in the combination with the first embodiment. It is placed closer to the inner peripheral face of the tone wheel 13a in combination with the second embodiment. Consequently, the change in density of magnetic flux flowing through the smaller diameter portion 14 of the tone wheel 13 or through the larger diameter portion 15a of the tone wheel 13a, as the tone wheel 13 (13a) rotates is larger to increase the output of the sensor 20c.

A plastic magnet can be used to process the first permanent magnet 31 in the shape as shown in FIG. 6.

The shape of the first permanent magnet 31 as in FIG. 6 is effective to increase the precision in detecting the rotating speed. Specifically, although the number of the through-holes 17a (17b) in the tone wheel 13 (13a) must be increased in order to increase the precision in detecting the rotating speed, if the number of south and north poles in the inner peripheral face (outer peripheral face) of the first permanent magnet 31 is increased corresponding to the number of the through-holes 17(17b), the adjacent south and north poles are too close to each other, so that the amount of magnetic flux directly flowing between the south poles and north poles without passing through the tone wheel 13 (13a) are increased.

Since the amount of magnetic flux flowing directly between the south and north poles is constant regardless of the rotation of the tone wheel 13 (13a), the fact that the adjacent south and north poles are placed too close to each other, would cause reduction in the sensor output.

If the first permanent magnet 31 is formed as in FIG. 6 with the pitch $P_{35}$ between the adjacent projections 35a and 35b controlled as mentioned above, the precision in detecting the rotating speed is increased while the output of the sensor is secured. Specifically, the adjacent south and north poles in the region of the projections 35a, 35b are sufficiently spaced apart from each other, so that no magnetic flux flows directly between the south and north poles, so that the sensor output is secured.

Also, it is possible to increase the precision in detecting the rotating speed by increasing the number of the through-holes 17a(17b) in the tone wheel 13 (13b). Specifically, since the pitch $P_{35}$ of the alternating projections 35a, 35b is set to m·p/2 where m is an odd integer and p is the pitch of the through-holes 17a (17b) in the tone wheel 13 (13a), m=3 in the example in FIG. 6, at the moment when all the north poles are opposed to the through holes 17a (17b), all the south poles are opposed to the column portions 34a (34b), respectively, or at the moment when all the south poles are opposed to the through-holes 17a (17b), all the north poles are opposed to the column portions 34a (34b). Accordingly, by arranging the first and second permanent magnets 31, 32 as in the first and second embodiments mentioned above, the magnetic flux flows alternatively in opposite directions thorough the smaller diameter portion 14 of the tone wheel 13 or through the larger diameter portion 15a of the tone wheel 13a as the tone wheel 13 (13a) rotates, where the frequency of the alternating magnetic flux is proportional to the rotating speed of the tone wheel 13 (13a) and to the number of the through-holes 17a (17b).

Consequently, it is possible to increase the precision in detecting the rotating speed by increasing the number of the through-holes 17a (17b) in the tone wheel 13 (13a) as in the present embodiment. For example, it is easily possible that the number of the through-holes 17a (17b) is 48, and that through-holes 17a (17b) are circumferentially arranged with a uniform space therebetween in part of the tone wheel 13 (13a). There is no need of complex processing technology for them.

On the other hand, it is difficult in the state of art to arrange the south and north poles, forty eight respectively, with a uniform space therebetween on the peripheral face of the first permanent magnet 31. Even if it is achieved, a certain amount of magnetic flux may flows directly between the adjacent south and north poles.

It should be noted that, in the present embodiment, sixteen south poles and sixteen north poles are arranged on the peripheral face of the first permanent magnet 31, so that the precision in detecting the rotating speed is improved while keeping the output of the sensor 20c enough.

In other words in the present embodiment, the number of the through-holes 17a, 17b and of the column portions 34a, 34b between the through-holes 17a, 17b is made an odd number multiple of the number of south and north poles, in other words, set to m·x, where m is an odd integer and x is the number of south and north poles (1 is excluded in this embodiment), so that the precision in detecting the rotating speed is improved by increasing the frequency in output change of the sensor 20c during a single rotation of the tone wheel 13 (13a) while keeping the output of the sensor 20c enough.

Figure 7:
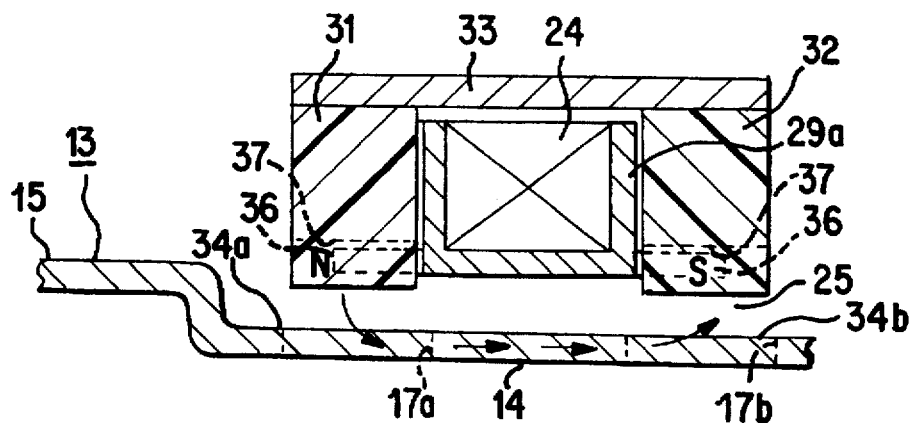
FIG. 7 is an enlarged, partial view similar to FIG. 3 to show a fourth embodiment of the present invention, where only cross-sections are illustrated.
Figure 8:
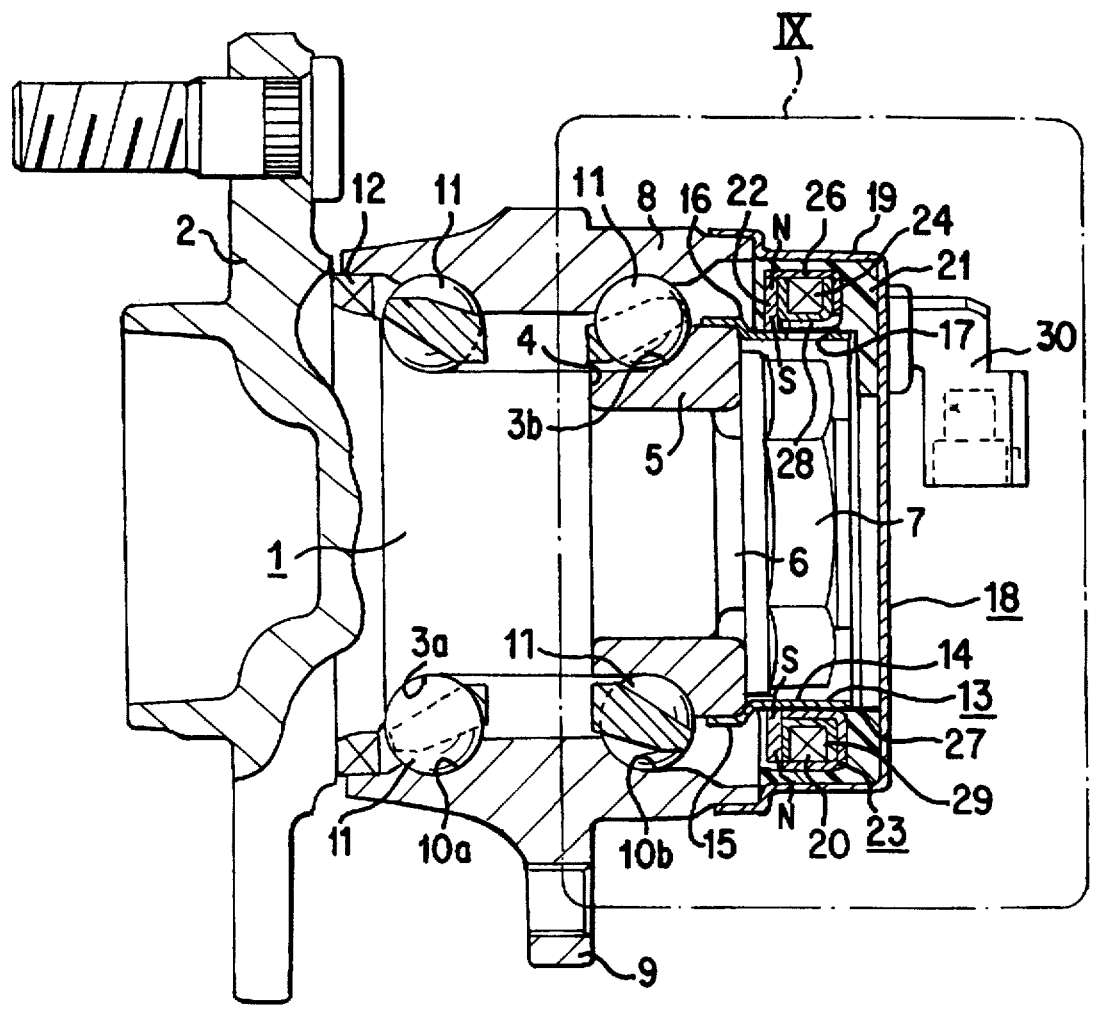
FIG. 8 is a partly cut-away, cross sectional view to show an example of the prior art structure.
Figure 9:
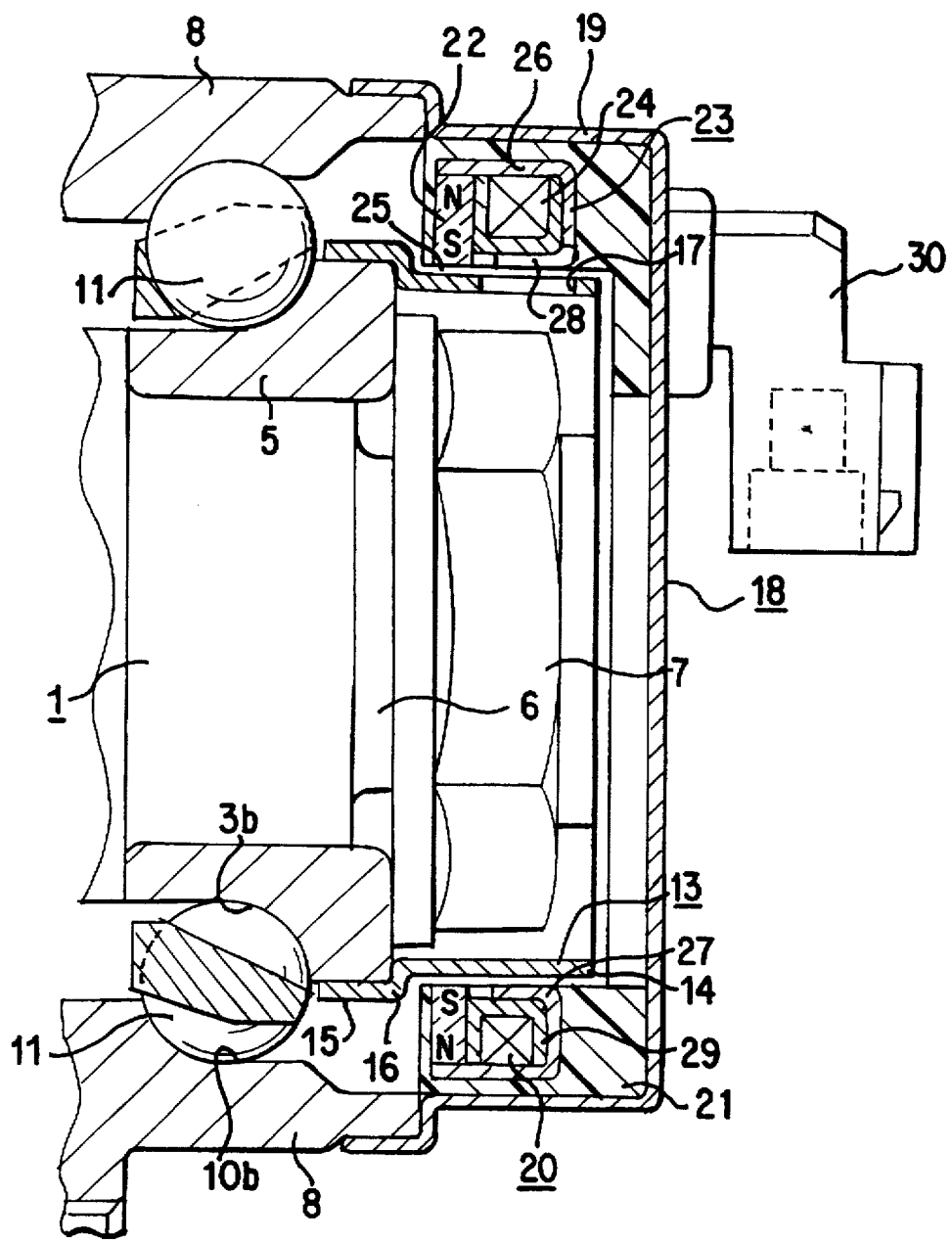
FIG. 9 is an enlarged, partly cut-away view of the portion VIII in FIG. 8.

FIG. 7 shows a fourth embodiment of the present invention. At least one projection 36 is formed in a portion closer to the inner periphery at both of the axial ends of the bobbin 29a, respectively, in combination with the structure in the first embodiment or to the outer periphery in combination with the structure in the second embodiment, such that the projection(s) 36 is engaged with the recess(s) 37 formed on the peripheral face of the first and second permanent magnets 31, 32.

By this construction in the fourth embodiment, the following effects are obtained in addition to those in the first and second embodiments.

The phase relation between the bobbin 29a and the first and second permanent magnets 31, 32 is controlled by engagement of the projection 36 with the recess 37. Accordingly, the phase relation between the first and second permanent magnets 31, 32 is controlled, so that the phase displacement in the circumference direction between the first and second permanents 31, 32 is prevented during the process for embedding the sensor in synthetic resin.

In this embodiment, combined with the third embodiment, the portions between the circumferentially adjacent projections 35a and 35b (look at FIG. 6) are desirably utilized for the recesses 37.

However, it is not necessarily combined with the third embodiment. Specifically, at least one circumferential location on the peripheral face of the first and second permanent magnets 31 and 32 is formed with a recess which is engaged with the projection 36, thereby the phase coincidence between the permanent magnets 31, 32 is secured.

Although in the embodiments above, the through-holes are used for the cutout section in the wheel, any notches open to the axial end edge of the tone wheel, or any recesses in a portion lower than the remaining portion on the peripheral face of the tone wheel can also be used for the cutout section.

Since the rolling bearing unit with rotating speed detector in the present invention constructed and operated as mentioned above, can provide a larger output, so that the rotating speed of vehicle wheel can positively obtained. In addition, the sensor with the same output can be made compact, so that it is possible to install the rolling bearing unit in a narrower space.

What is claimed is:

1. A rolling bearing unit with rotating speed detector comprising a stationary ring having an end and a first peripheral face formed with a stationary raceway, a cover fixed to the end of the stationary ring, a rotating ring having an end and a second peripheral face being opposite to the first peripheral face and formed with a rotating raceway, a plurality of rolling elements rotatably provided between the stationary raceway and the rotating raceway, an annular tone wheel made of a magnetic material fixed to the end of the rotating ring, and having a cutout section where a plurality of cutouts are circumferentially formed with a first pitch and a sensor opposed to the tone wheel and supported inside the cover, the tone wheel having a rotating cylindrical portion having a peripheral face and being concentric with the rotating and stationary rings, the cutout section formed in the peripheral face of the rotating cylindrical portion, the sensor comprising an annular first and second permanent magnets, an annular magnetic stator with ends, and an annular coil, the coil provided circumferentially around the stator between the ends, the first and second permanent magnets having a first end face in magnetic orientation provided with the south and north poles alternately arranged with a uniform pitch, and faced to the cutout section in the peripheral face of the rotating cylindrical portion with a small clearance therebetween, the first and second permanent magnets having a second end face in magnetic orientation provided in contact with or close to the ends of the stator respectively, the south and north poles in the first end face in magnetic orientation of the first and second permanent magnets having a second pitch which is set to n·p, where n is an integer, and p is the first pitch of the cutouts in the cutout section, the first and second permanent magnets having a phase relationship with the cutout section, such that the phase of the south and north poles in the first end face in magnetic orientation of the first permanent magnet with reference to the cutout section is displaced from the phase of the south and north poles in the first end face in magnetic orientation of the second permanent magnet with reference at the cutout section by m·p/2, where m is an odd integer and p is the first pitch of the cutouts in the cutout section, whereby, at the moment when all of the south poles in the first end face in magnetic orientation of the first permanent magnet are faced to the cutouts respectively, all of the north poles in the first end face of the second permanent magnet are faced to the cutouts.

2. A rolling bearing unit with rotating speed detector comprising a stationary ring having an end and a first peripheral face formed with a stationary raceway, a cover fixed to the end of the stationary ring, a rotating ring having an end and a second peripheral face being opposite to the first peripheral face and formed with a rotating raceway, a plurality of rolling elements rotatably provided between the stationary elements rotatably provided between the stationary raceway and the rotating raceway, an annular tone wheel made of a magnetic material, fixed to the end of the rotating ring, and having a cutout section where a plurality of through-holes are circumferentially formed with a first pitch and a sensor opposed to the tone wheel and supported inside the cover, the tone wheel having a rotating cylindrical portion having a peripheral face and being concentric with the rotating and stationary rings, the cutout section formed in the peripheral face of the rotating cylindrical portion, the sensor comprising an annular first and second permanent magnets, an annular magnetic stator with ends, and an annular coil, the coil provided circumferentially around the stator between the ends, the first and second permanent magnets having a first end face in magnetic orientation provided with the south and north poles alternately arranged with a uniform pitch, and faced to the cutout section in the peripheral face of the rotating cylindrical portion with a small clearance therebetween, the first and second permanent magnets having a second end face in magnetic orientation provided in contact with or close to the ends of the stator respectively, the south and north poles in the first end face in magnetic orientation of the first and second permanent magnets having a second pitch which is set to n·p, where n is an integer, and p is the first pitch of the through-holes in the cutout section, the first and second permanent magnets having a phase relationship with the cutout section, such that the phase of the south and north poles in the first end face in magnetic orientation of the first permanent magnet with reference to the cutout section is displaced from the phase of the south and north poles in the first end face in magnetic orientation of the second permanent magnet with reference at the cutout section by m·p/2, where m is an odd integer and p is the first pitch of the through-holes in the cutout section, whereby, at the moment when all of the south poles in the first end face in magnetic orientation of the first permanent magnet are faced to the through-holes respectively, all of the north poles in the first end face of the second permanent magnet are faced to the through-holes.

* * * * *